United States Patent Office 3,767,651
Patented Oct. 23, 1973

3,767,651
**NOVEL CYANINE DYES DERIVED FROM
1,2-DIPHENYLINDOLES**
Derek D. Chapman, Rochester, N.Y., assignor to
Eastman Kodak Company, Rochester, N.Y.
No Drawing. Original application July 22, 1968, Ser. No.
746,259, now Patent No. 3,598,596, dated Aug. 10,
1971. Divided and this application Mar. 22, 1971, Ser.
No. 126,876
Int. Cl. C09b 23/06, 23/10
U.S. Cl. 260—240 E  7 Claims

ABSTRACT OF THE DISCLOSURE

Novel cyanine dyes are provided which feature a 1,2-diarylindole nucleus. Light sensitive silver halide emulsions containing these dyes are also provided.

---

This application is a division of my copending application Ser. No. 746,259, filed July 22, 1968, now U.S. Pat. 3,598,596, granted Aug. 10, 1971.

This invention relates to novel cyanine dyes, and to photographic silver halide emulsions containing the dyes.

It is known that cyanine dyes derived from 1-alkyl-2-arylindoles function as spectral sensitizers and electron acceptors in direct positive photographic silver halide emulsions to give direct positive images of excellent quality. However, it has been found that such emulsions, and photographic elements produced therewith are unstable during storage. For example, measurable loss in sensitivity has been noted almost immediately following the preparation of such materials. This has seriously limited the commercial production and uses thereof. It is apparent, therefore, that there is need in the art for new cyanine dyes that would be capable of giving improved direct positive emulsions having not only good speed and selective sensitivity with effective reversal properties, but having in addition, desirably improved keeping and storage stability.

It is, accordingly, an object of this invention to provide a new class of cyanine dyes which overcome the shortcomings of the above mentioned prior art dyes.

Another object of this invention is to provide novel light sensitive photographic silver halide emulsions containing one or more of the new cyanine dyes of this invention.

Still another object of this invention is to provide novel photographic elements comprising a support having thereon at least one layer containing a novel direct positive emulsion of this invention.

Another object of this invention is to provide novel photographic materials containing the dyes of this invention.

Other objects of this invention will be apparent from this disclosure and the appended claims.

I have now made the important discovery that cyanine dyes derived from 1,2-diphenylindoles are outstanding electron acceptors and spectral sensitizers for direct positive type photographic silver halide emulsions. They provide superior reversal systems, especially with fogged silver halide emulsions, that are characterized by both good speed and spectral sensitivity to radiation up through the green to red region of the spectrum. Maximum sensitivity occurs in most cases in the region of about 540 to 640 nm. Moreover, these novel emulsions and photographic elements exhibit unexpectedly good keeping and storage stability during manufacture and over commercially useful periods of time. The images produced with these novel direct positive emulsions of the invention are clear and sharp, and of excellent contrast.

In accordance with one embodiment of this invention, cyanine dyes are provided comprising first and second 5- to 6-membered nitrogen containing heterocyclic nuclei joined by methine linkage; the first of said nuclei being a 1,2-diarylindole nucleus joined at the 3-carbon atom to said linkage; and second second nucleus being selected from the group consisting of a 1,2-diarylindole nucleus joined at the 3-carbon atom to said linkage, and a desensitizing nucleus joined at a carbon atom thereof to said linkage, to complete said cyanine dye.

In another embodiment of this invention, novel light sensitive silver halide emulsions are provided containing a cyanine dye of the type described herein.

The preferred cyanine dyes of the invention include those represented by one of the following formulas:

(I) 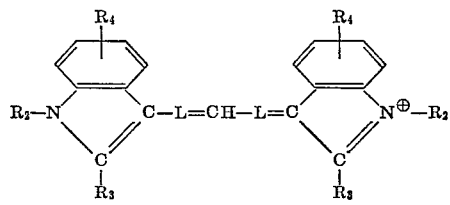

and (II) 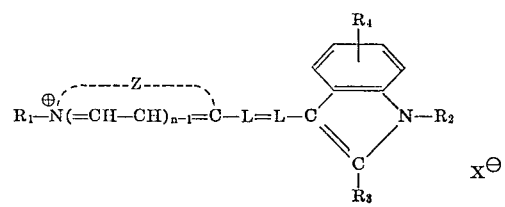

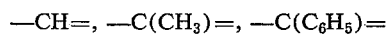

wherein $n$ represents a positive integer of from 1 to 2; L represents a methine linkage, e.g., $$-CH=, \ -C(CH_3)=, \ -C(C_6H_5)=$$

etc.; $R_1$ represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups (preferably a substituted lower alkyl containing from 1 to 4 carbon atoms), such as a hydroxyalkyl group, e.g., $\beta$-hydroxyethyl, $\omega$-hydroxybutyl, etc., an alkoxyalkyl group, e.g., $\beta$-methoxyethyl $\omega$-butoxybutyl, etc., a carboxyalkyl group e.g. $\beta$-carboxyethyl, $\omega$-carboxybutyl, etc., a sulfoalkyl group, e.g., $\beta$-sulfoethyl, $\omega$-sulfobutyl, etc., a sulfatoalkyl group, e.g., $\beta$-sulfatoethyl, $\omega$-sulfatobutyl, etc., an acyloxyalkyl group, e.g., $\beta$-acetoxyethyl, $\gamma$-acetoxypropyl, $\omega$-butyryloxybutyl, etc., an alkoxycarbonylalkyl group, e.g., $\beta$-methoxycarbonylethyl, $\omega$-ethoxycarbonylbutyl, etc., or an aralkyl group, e.g., benzyl, phenethyl, etc., and the like; or an alkenyl group, e.g., allyl, 1-propenyl, 2-butenyl, etc., or an aryl group, e.g., phenyl tolyl, naphthyl, methoxyphenyl, chlorophenyl, etc.; $R_2$ and $R_3$ each represents an aryl group, e.g., phenyl, tolyl, naphthyl, chlorophenyl, nitrophenyl, etc.; $R_4$ represents a hydrogen atom, an alkyl group (preferably a lower alkyl containing from 1 to 4 carbon atoms), e.g., methyl, ethyl, propyl, isopropyl, butyl, decyl, etc., an alkoxy group (preferably containing from 1 to 4 carbon atoms), e.g., methoxy, butoxy, etc., an aryloxy group, e.g., phenoxy, tolyloxy, etc., a halogen atom, e.g., chlorine or bromine, or nitro, etc.; X represents an acid anion, e.g., chloride, bromide, iodide, sulfamate, perchlorate, p-toluenesulfonate, methyl sulfate, etc.; and Z represents the non-metallic atoms necessary to complete a desensitizing heterocyclic nucleus containing from 5 to 6 atoms in a heterocyclic ring, such as a heterocyclic ring selected from the group including a nitrobenzothiazole nucleus, e.g., 5-nitrobenzothiazole, 6-nitrobenzothiazole, 5-chloro-6-nitrobenzothiazole, etc.; a nitrobenzoxazole nucleus, e.g., 5-nitrobenzoxazole, 6-nitrobenzoxazole, 5-chloro-6-nitrobenzoxazole, etc.; a nitrobenzoselenazole nucleus, e.g., 5 - nitrobenzoselenazole, 6 - nitrobenzoselenazole, 5-chloro-6-nitrobenzoselenazole, etc.; an imidazo[4,5-b] quinoxaline nucleus, e.g., imidazo[4,5-b]quinoxaline, 1,3-dialkylimidazo[4,5-b]quinoxaline such as 1,3-diethylimidazo[4,5-b]quinoxaline, 6-chloro-1,3-diethylimidazo-[4,5-b]quinoxaline, etc., 1,3 - dialkenylimidazo[4,5-b] quinoxaline such as 1,3-diallylimidazo[4,5-b]quinoxaline, 6,7 - dichloro-1,3-diallylimidazo[4,5-b]quinoxaline, etc., 1,3-diarylimidazo[4,5-b] quinoxaline such as 1,3-diphenyl imidazo[4,5-b]quinoxaline, 6 - chloro-1,3-diphenylimidazo[4,5-b]quinoxaline, etc.; a 3,3-dialkyl - 3H - pyrrolo-[2,3-b]pyridine nucleus, e.g., 3,3-dimethyl-3H-pyrrolo-[2,3-b]pyridine, 3,3 - diethyl-3H-pyrrolo[2,3-b]pyridine, etc.; a 3,3-dialkyl-3H-nitrindole, e.g., 3,3-dimethyl-5-nitro-3H-indole, 3,3-diethyl-5-nitro - 3H - indole, 3,3-dimethyl-6-nitro-3H-indole, etc.; a thiazolo[4,5-b]quinoline nucleus; or a nitroquinoline nucleus, e.g., 5-nitroquinoline, 6-nitroquinoline, etc.; and the like. Other desensitizing nuclei defined by Z in above Formula II that are useful include nitrothiazole, nitronaphthothiazole, nitroxazole, nitronaphthoxazole, nitroselenazole, nitronaphthoselenazole, and nitropyridine nuclei. Dyes of Formula II above wherein Z represents the non-metallic atoms required to complete an imidazo[4,5-b]quinoxaline nucleus are especially useful and are the preferred dye species of the invention.

The cyanine dyes of the invention defined above are powerful electron acceptors for direct positive photographic silver halide emulsions. In addition, they are also useful desensitizers in emulsion used in the process described in Stewart and Reeves, U.S. Pat. No. 3,250,618, issued May 10, 1966.

As used herein and in the appended claims, "desensitizing nuclei" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 gram dye per mole of silver, cause by electron trapping at least about an 80 percent loss in the blue speed of the emulsion when sensitometrically exposed and developed three minutes in Kodak developer D-19 at room temperature. Advantageously, the desensitizing nuclei are those which, when converted to a symmetrical carbocyanine dye and tested as just described essentially completely desensitize the test emulsion to blue radiation (i.e., cause more than about 90 to 95% loss of speed to blue radiation).

The symmetrical cyanine dyes defined by Formula I above are conveniently prepared by reacting a mixture comprising (1) an indole of the formula:

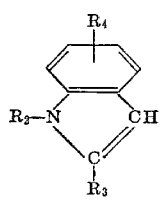

wherein $R_2$, $R_4$ and $R_3$ are as previously defined, with (2) a compound such as trimethoxypropene, in the presence of (3) a strong acid HX such as a mineral acid or an organic sulfonic acid, e.g., hydrobromic, perchloric, p-toluenesulfonic, etc. acids, in an inert solvent medium such as hot glacial acetic acid, in the proportions of about 2 moles of (1) and at least 1 mole of each of (2) and (3). The crude dyes obtained are purified by one or more recrystallizations from appropriate solvents such as methanol.

The unsymmetrical cyanine dyes defined by Formula II above are prepared conveniently by reacting a mixture comprising (1) an indole of the formula:

(IV)

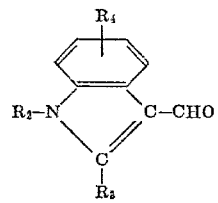

wherein $R_2$, $R_3$ and $R_4$ are as previously defined, with (2) a heterocyclic compound of the formula:

(VI)

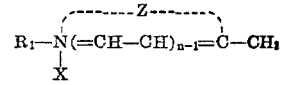

wherein $n$, $R_1$, X and Z are as previously defined, in approximately equimolar proportions of (1) and (2), in an inert solvent medium such as hot acetic anhydride. The crude dye obtained is purified by one or more recrystallizations from appropriate solvents such as methanol.

In accordance with the invention, novel and improved direct positive photographic silver halide emulsions are prepared by incorporating one or more of the cyanine dyes of the invention into a suitable fogged silver halide emulsion. The emulsion can be fogged in any suitable manner, such as by light or with chemical fogging agents, e.g., stannous chloride, formaldehyde, thiourea dioxide, and the like. The emulsion may be fogged by the addition thereto of a reducing agent, such as thiourea dioxide, and a compound of a metal more electropositive than silver, such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about .05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK-50 having the composition set forth below, when the emulsion is coated at a silver coverage of 50 mg. to 500 mg. per square foot.

DEVELOPER

|  | G. |
|---|---|
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |
| Water to make 1.0 l. | |

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. patent application Ser. No. 448,467, filed Apr. 15, 1965, now U.S. Pat. 3,367,778, granted Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

| | G. |
|---|---|
| N-methyl-p-aminophenol sulfate | 2.5 |
| Ascorbic acid | 10.0 |
| Potassium metaborate | 35.0 |
| Potassium bromide | 1.0 |

Water to 1 liter.
pH of 9.6.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Sauvenier in Science et Industries Photographiques, vol. XXVIII, January 1957, pp. 1–23 and January 1957, pp. 57–65, are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The dyes of this invention are highly useful electron acceptors in high speed direct positive emulsions comprising fogged silver halide grains and a compound which accepts electrons, as described and claimed in Illingsworth U.S. patent application Ser. No. 619,936, filed March. 2, 1967, now U.S. Pat. 3,501,307, granted Mar. 17, 1970, and titled "Photographic Reversal Materials Case C." The fogged silver halide grains of such emulsions are such that a test portion thereof, when coated as a photographic silver halide emulsion on a support to give a maximum density of at least about one upon processing for six minutes at about 68° F. in Kodak DK-50 developer, has a maximum density which is at least about 30% greater than the maximum density of an identical coated test portion which is processed for six minutes at about 68° F. in Kodak DK-50 developer after being bleached for about 10 minutes at about 68° F. in a bleach composition of:

| | |
|---|---|
| Potassium cyanide, mg. | 50 |
| Acetic acid (glacial), cc. | 3.47 |
| Sodium acetate, g. | 11.49 |
| Potassium bromide, mg. | 119 |

Water to 1 liter.

The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating with an identical coating which is processed for six minutes at 68° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. patent application Ser. No. 619,909, filed Mar. 2, 1967, now U.S. Pat. 3,501,306, granted Mar. 17, 1970, and titled "Direct Positive Photographic Emulsions Case A." Such grains advantageously have a rather uniform diameter frequency distribution, as described and claimed in Illingsworth U.S. patent application Ser. No. 619,948, filed Mar. 2, 1967, now U.S. Pat. 3,501,305, granted Mar. 17, 1970, and titled "Photographic Reversal Emulsions Case B." For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pp. 330–338. The fogged silver halide grains in these direct-positive photographic emulsions of this invention produce a density of at least 0.5 when developed without exposure for five minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

The incorporation of photographic couplers or photographic coupler solvents (such as those described in Jelley et al. U.S. Pat. 2,322,027, issued June 15, 1943) in direct positive emulsions of the type in which a silver halide grain has a water-insoluble silver salt center and an outer shell composed of a fogged water-insoluble silver salt that develops to silver without exposure, prepared in various ways such as those described in Berriman U.S. Pat. 3,367,778, issued Feb. 6, 1968, improve incubation stability; especially improved is the great $D_{max}$ loss usually seen on incubation, with no less in speed; this improvement is obtained when the emulsions are processed in black-and-white Elon-hydroquinone developers and color developers. A useful coupler solvent is di-n-butyl phthalate and useful couplers are cyan amidophenol couplers such as those described in U.S. Pat. 2,895,826 and the combination of an amidophenol coupler and a phenolic cyan coupler of the type described in U.S. Pat. 2,474,293.

In the preparation of the above photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pat. 3,142,568; 3,193,386; 3,062,674 and 3,220,844 and include the water insoluble polymers of alkyl acrylates and methacrylates, acrylic acid, sulfoalkyl acrylates or methacrylates and the like.

The dyes, reducing agents and metal compounds of the invention can be used with emulsions prepared, as indicated above, with any of the light-sensitive silver halide salts including silver chloride, silver bromide, silver chlorobromide, silver bromoiodide, silver chlorobromoiodide, etc. Particularly useful are direct positive fogged emulsions in which the silver salt is a silver bromohalide comprising more than 50 mole percent bromide. Certain dyes of this invention are also useful in emulsions which contain formers.

The novel emulsions of this invention may be coated on any suitable photographic support, such as glass, film base such as cellulose acetate, cellulose acetate butyrate, polyesters such as poly(ethylene terephthalate), paper, baryta coated paper, polyolefin coated paper, e.g., polyethylene or polypropylene coated paper, which may be electron bombarded to promote emulsion adhesion, to produce the novel photographic elements of the invention.

The following examples are included for a further understanding of the invention.

EXAMPLE 1

1,1',2,2' - tetraphenyl-3,3'-indolocarbocyanine perchlorate 1,2-diphenylindole (2.83 g.) is dissolved in acetic acid (25 ml.) and heated to boiling. p-Toluenesulfonic acid (1.99 g.) is added followed by trimethoxypropane (4 g.). After one minute the mixture is cooled and poured into water (150 ml.) containing sodium perchlorate (3 g.). The dye is filtered off and purified by recrystallization from methanol. The yield of purified dye is 0.7 g. (21%), M.P. 232–233° C., dec.

The above prepared dye containing two 1,2-diphenylindole nuclei is photographically tested for its usefulness as an electron acceptor and spectral sensitizer for fogged direct positive photographic silver halide emulsions by the following procedures.

(a) A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner. The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The above prepared dye is added to the above fogged emulsion in the concentration indicated in Table I hereinafter, of the dye per mole of silver. The resulting emulsion is then coated on a cellulose acetate film support at a coverage of 100 mg. of silver and 400 mg. of gelatin per square foot of support.

A sample of the coated support is then exposed to an Eastman Ib sensitometer using a tungsten light source and processed for 6 minutes at room temperature in Kodak D–19 developer which has the following composition:

| | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | then fixed, washed and dried. The results are listed in Table I. Referring thereto, it will be seen that the dye of this example has a maximum density in the unexposed areas of 1.02 and a minimum density in exposed areas of .05, a maximum sensitivity at 650 nm. and a relative speed of 100, whereas the control sample similarly prepared and tested but containing no spectral sensitizing dye shows no reversal and has a relative speed of less than 1. This result indicates that the dye compound of the above example is well suited to function as a spectral sensitizer and electron acceptor. It thus provides excellent quality direct positive photographic silver halide emulsions. Excellent magenta images were obtained when the color former 1-(2,4,6-trichlorophenyl)-3,3'-(2",4"-di-t-amylphenoxyacetamido)benzimido-5-pyrazolone was incorporated in the emulsion of this example, the emulsion coated on a support, exposed to a tungsten source through Wratten filter No. 61 and No. 16, and reversal processed as described in Graham et al. U.S. Pat. 3,046,129, issued July 24, 1962, in Example (a), col. 27, lines 27 et seq. except that black-and-white (MQ) development was omitted, the color development was reduced to one minute and was conducted in total darkness until after fixing.

Table 1 also shows comparison results with an analogous dye prepared with 1-methyl-2-phenylindole designated therein as Example 1A. While the speed and contrast of this example is somewhat higher than that shown for Example 1 of this invention, it will be noted that the density loss at 120° F. after one week keeping is 77.8% compared with only 31.4% for Example 1 of the invention. Thus, a very marked improvement in the keeping stability is indicated for the photographic materials of this invention as represented by above Example 1.

(b) The above test procedure was repeated, except that a silver bromoiodide fogged direct positive emulsion of the type described in Berriman U.S. Pat. No. 3,367,778, Feb. 6, 1968, is substituted as the test emulsion. The results are listed in Table 2 hereinafter. It will be seen therefrom that Example 1 of this invention shows improved results over those of the previously described test with densities of 1.90 and .05 for the unexposed and exposed areas, respectively, a maximum sensitivity substantially the same, and greatly increased speed of 795. Also the keeping stability test shows a density loss of only 34.1% compared with a denity loss of 54.4% for the comparison Example 1A, containing the analogous dye derived from 1-methyl-2-phenylindole.

EXAMPLE 2

1,3-diethyl-1',2'-diphenylimidazo[4,5-b]quinoxalino-3'-indolo carbocyanine p-toluenesulfonate 1,3 - diethyl - 2 - methyl[4,5-b]quinoxalinium p-toluenesulfonate (4.12 g., 0.01 mole) and 1,2-diphenylindole-3-carboxaldehyde (2.97 g., 0.01 mole) in acetic anhydride (25 ml.) are heated to boiling for one minute. After cooling the reaction mixture is diluted with ether. The product is filtered off and washed with ether. After two recrystallizations from isopropyl alcohol the yield of purified dye is 3.2 g. (46%), M.P. 231–232° C., dec.

The dye containing the desensitizing 1,2-diphenylimidazo[4,5-b]quinoxaline nucleus is tested for reversal, sensitizing properties and keeping stability by the exact procedures described in above Example 1. The results are recorded in Table 1 hereinafter. Referring to the table, densities of 1.80 and .04 for the unexposed and exposed areas, respectively, a maximum sensitivity at 545 nm. and a relative speed of 1380 are shown for this dye. Accordingly, the above prepared dye is an excellent electron acceptor and spectral sensitizer for fogged direct positive emulsions. Also, the emulsion shows unexpectedly good keeping stability as set forth below.

The analogous dye prepared with 1-methyl-2-phenylindole for comparison purposes and designated in Table 1 as Example 2A, shows about the same densities, maximum sensitivity and speed as Example 2 of this invention. However, the density loss on keeping as indicated in the table is 55.6% for comparison Example 2A, whereas only a loss of about 36.7% is indicated for Example 2 of this invention. Table 2 shows with the Berriman type of emulsion (referred to in above Example 1) substantially the same densities for the unexposed and exposed regions, with about the same maximum sensitivities, and somewhat decreased relative speeds to 871 for both Example 2 of this invention and comparison Example 2A. However, the keeping stability of Example 2 of the invention is clearly superior to that of the comparison Example 2A, the density loss being 23.1% and 32.7%, respectively.

EXAMPLE 3

1,2-diphenyl-3'-ethyl-6'-nitroindolothiacarbocyanine p-toluenesulfonate

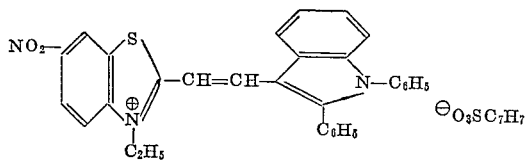

This dye is prepared in the manner described in Example 2 except that 3-ethyl-2-methyl-6-nitrobenzothiazolium p-toluenesulfonate (3.95 g., 0.01 mole) is used in place of the 1,3-diethyl-2-methylimidazo[4,5-b]quinoxalinium p-toluenesulfonate. After two recrystallizations from methanol the yield of purified dye is 3.7 g. (55%), M.P. 271–272° C., dec.

The above prepared dye containing the desensitizing 3-ethyl-6-nitrobenzothiazole nucleus is tested for reversal, sensitizing properties and keeping stability by the procedures described in above Example 1. The results are recorded in Table 1 hereinafter. Referring thereto, it will be noted that the densities are 1.02 and .07 for the unexposed and exposed areas, respectively, with a maximum sensitivity at 570 nm., and a relative speed of 1450. These results indicate that this dye is a moderately good electron acceptor and spectral sensitizer for fogged direct positive emulsions. The comparison dye example prepared from 1-methyl-2-phenylindole and designated in Table 1 as Example 3A shows about the same sensitometric properties and about the same keeping stability as Example 3 of this invention. However, it will be noted from Table 2 hereinafter, that by substitution the Berriman type of emulsion (referred to in above Example 1) in the above described procedure that while both Example 3 and comparison Example 3A show similarly improved maximum density values, the keeping stability of Example 3 of this invention is markedly improved over Example 3A with this particular emulsion, the former indicating a density loss of about 28.2% compared with a density loss of 38.5% for the latter.

EXAMPLE 4

6-chloro-1,1',2',3-tetraphenylimidazo[4,5-b]quinoxalino-3'-indolocarbocyanine p-toluenesulfonate

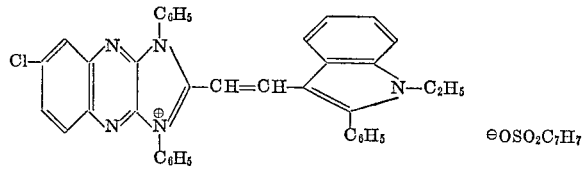

This dye is prepared in the manner described in Example 2 except that 6-chloro-2-methyl-1,3-diphenylimidazo[4,5-b]quinoxalinium p-toluenesulfonate (5.43 g. 0.01 mole) is used in place of the 1,3-diethyl-2-methylimidazo[4,5-b]quinoxalinium p-toluenesulfonate. After two recrystallizations from methanol/isopropyl alcohol the yield of purified dye is 4.1 g. (50%), M.P. 291–292° C., dec.

The above dye containing the desensitizing 1,3-diphenyl-imidazo[4,5-b]quinoxaline nucleus is tested by the exact procedures of above Example 1. The results as shown in Table I hereinafter indicates that this dye qualifies as a good electron acceptor and spectral sensitizer for fogged direct positive photographic emulsions. The densities are shown to be 1.02 and .05 for the unexposed and exposed areas, respectively, with a maximum sensitivity at 580 nm. and a relative speed of 350.

Referring further to Table I it will be seen that above Example 4 of this invention displays improved keeping stability (27.5% loss in density) as compared with the analogous dye derived from 1-methyl-2-phenylindole (34.5% loss in density).

EXAMPLE 5

1,3,3-trimethyl-5-nitro-1',2'-diphenylindo-3'-indolocarbocyanine p-toluenesulfonate

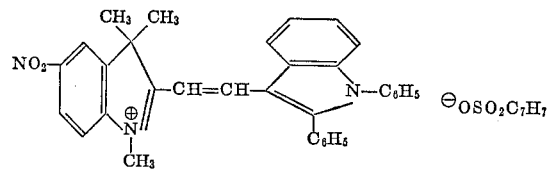

This dye is prepared in the manner described in Example 2 except that 1,2,3,3-tetramethyl-5-nitroindolium p-toluenesulfonate (3.9 g., 0.01 mole) is used in place of the 1,3-diethyl-2-methylimidazo[4,5-b]quinoxalinium p-toluenesulfonate. After two recrystallizations from ethanol, the yield of purified dye is 4.6 g. (69%), M.P. 175–177° C.

The above dye containing the 1,3,3-trimethyl-5-nitro-3H-indoline nucleus is tested by the procedures of above Example 1. The results are shown in Table 1 and Table 2 hereinafter. Referring to Table I, the densities are 1.06 and .05 for the unexposed and exposed areas, respectively, with a maximum sensitivity at 575 nm. and a relative speed of 1380 for Example 5 of this invention. For the comparison Example 5A containing the analogous dye derived from 1-methyl-2-phenylindole, the corresponding values are about the same. However, Example 5 of the invention is markedly better as to keeping stability showing a density loss of only 27.9% compared with a density loss of 33.6% for comparison Example 5A. Referring to Table 2, Example 5 of the invention shows a substantial improvement with the Berriman type of emulsion (referred to in above Example 1) as to the maximum density in the unexposed areas and as to keeping stability these values being 1.87 and 24%, respectively. Accordingly, the dye of Example 5 of this invention provides fogged direct positive silver halide emulsions having not only good spectral sensitizing and excellent electron acceptor properties, but having in addition, markedly improved keeping stability as compared with emulsions containing only the analogous dye derived from 1-methyl-2-phenylindole.

EXAMPLE 6

1,2-diphenyl-1′,3,3′-trimethyl-3-indolo-3H-pyrrolo[2,3-b]pyrido-carbocyanine perchlorate

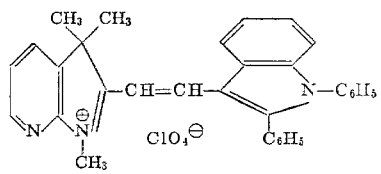

This dye is prepared as described in Example 2 except that a mixture of 1,2-dihydro-1,3,3-trimethyl-2-methylenepyrrolo[2,3-b]pyridine (1.74 g., 0.01 mole) and p-toluenesulfonic acid monohydrate (1.9 g.) are used in place of the 1,3-diethyl-2-methylimidazo[4,5-b]quinoxalinium p-toluenesulfonate. The dye is collected and purified by recrystallization from methanol. After two recrystallizations the yield of dye is 2.5 g. (40%), M.P. 289–291° C. dec.

The above dye containing 1,3,3-trimethylpyrrolo[2,3-b]pyridine nucleus is tested by the procedures of above Example 1. The results are listed in Table 1 and Table 2 hereinafter. Referring to Table 1, Example 6 of this invention shows densities of 1.06 to .05 for the unexposed and exposed areas, respectively, with maximum sensitivity at 535 nm., a relative speed of 1320 and a keeping stability of 29.2%, whereas the corresponding values for comparison Example 6A employing the analogous dye derived from 1-methyl-2-phenylindole show densities of 0.88 and .05, maximum sensitivity at 535 nm., relative speed of 1320, and keeping stability of 48.9%. Thus, Example 6 of this invention shows marked improvement in keeping stability over that of comparison Example 6A. Referring to Table 2, Example 5 of the invention shows a substantial increase of maximum density to 1.81 in the unexposed areas with the Berriman type of emulsion (referred to in above Example 1). Accordingly, the dye of Example 6 of this invention provides fogged direct positive silver halide emulsions having excellent spectral sensitizing and electron acceptor properties, together with outstanding keeping stability.

The photographic test data is recorded in the following tables.

TABLE I

The dyes of the invention are compared herein to analogous dyes prepared from 1-methyl-2-phenylindole, these latter dyes being designated as 1A, 2A, etc., corresponding to Examples 1, 2, etc. of the invention.

| Example number | Dye concentration mg./mole silver | Relative clear speed | Density Max. unexposed areas | Density Min. exposed areas | Percent D$_{max}$. loss 1 week 120° F., 50% rel. humidity | Max. sensitivity, nm. |
|---|---|---|---|---|---|---|
| 1 | 650 | 100 | 1.02 | .05 | 31.4 | 650 |
| 1A | 150 | 525 | 1.44 | .09 | 77.8 | 640 |
| 3 | 650 | 1,450 | 1.02 | .07 | 42.1 | 570 |
| 3A | 500 | 1,100 | .97 | .05 | 42.3 | 580 |
| 2 | 500 | 1,380 | 1.80 | .04 | 36.7 | 545 |
| 2A | 500 | 1,450 | 1.80 | .05 | 55.6 | 550 |
| 6 | 450 | 1,320 | 1.06 | .05 | 29.2 | 535 |
| 6A | 550 | 1,320 | .88 | .05 | 48.9 | 535 |
| 4 | 350 | 1,380 | 1.02 | .05 | 27.5 | 580 |
| 4A | 500 | 1,910 | .98 | .05 | 34.5 | 585 |
| 5 | 500 | 1,380 | 1.06 | .05 | 27.9 | 575 |
| 5A | 440 | 1,320 | 1.04 | .05 | 33.6 | 575 |
| Control | | <1 | No reversal | | | |

TABLE 2

The dyes of the invention are tested and compared herein in similar fashion as in above Table 1, except that a silver bromoiodide fogged direct positive emulsion of the type described by Berriman in U.S. Pat. No. 3,367,778, issued Feb. 6, 1968, is employed in each instance.

| Example number | Dye concentration mg./mole silver | Relative clear speed | Density Max. unexposed areas | Density Min. exposed areas | Percent D$_{max}$. loss 1 week 120° F., 50% rel. humidity | Max. sensitivity, nm. |
|---|---|---|---|---|---|---|
| 1 | 800 | 795 | 1.90 | .05 | 34.1 | 640 |
| 1A | 150 | 603 | 1.62 | .16 | 54.4 | 630 |
| 3 | 550 | 631 | 1.84 | .05 | 28.2 | 560 |
| 3A | 550 | 617 | 1.84 | .07 | 38.5 | 575 |
| 2 | 450 | 871 | 1.90 | .04 | 23.1 | 540 |
| 2A | 500 | 871 | 1.86 | .04 | 32.7 | 550 |
| 6 | 600 | 891 | 1.81 | .04 | 36 | 540 |
| 5 | 550 | 912 | 1.87 | .04 | 24 | 590 |

As will be seen from the above tables, the novel dyes of the invention are not only excellent electron acceptors and spectral sensitizers for fogged direct positive silver halide emulsions, but provide emulsions of this type having unexpectedly improved keeping stability over the corresponding dyes derived from 1-methyl-2-phenylindole.

Dyes of the invention which feature a 1-(nitroaryl)-2-arylindole nucleus are highly useful. Typical dyes of this type are shown in Examples 7–10.

EXAMPLE 7

1,3-diethyl-1′-(4-nitrophenyl)-2′-phenylimidazo[4,5-b]quinoxalino-3′-indolocarbocyanine p-toluenesulfonate

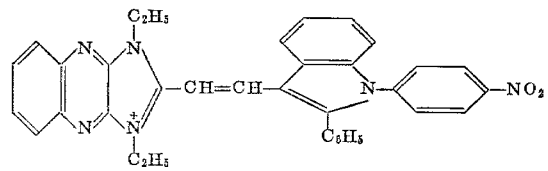

1-(4-nitrophenyl)-2-phenylindole-3-carboxaldehyde (1.03 g., 0.003 mole) and 1,3-diethyl-2-methylimidazo[4,5-b]quinoxalinium p-toluenesulfonate (1.23 g., 0.003 mole) in acetic anhydride (10 ml.) are heated to boiling for two minutes. The cooled solution is diluted with ether and the precipitated dye filtered off. After two recrystallizations from methanol the yield of purified dye is 1.0 g. (45%), M.P. 198–200°.

EXAMPLE 8

3′-ethyl-6′-nitro-1-(4-nitrophenyl)-2-phenyl-3-indolothiacarbocyanine p-toluenesulfonate

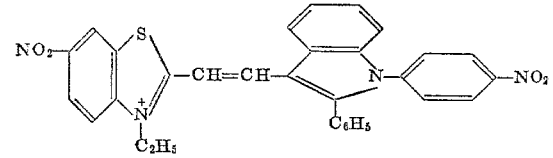

This dye is prepared as described in Example 7 except that 3-ethyl-2-methyl-6-nitrobenzothiazolium p-toluenesulfonate (1.2 g., 0.003 mole) is used in place of the 1,3-diethyl-2-methylimidazo[4,5-b]quinoxalinium p-toluenesulfonate. After two recrystallizations from methanol, the yield of purified dye is 1.0 g. (45%), M.P. 286–287° d.

EXAMPLE 9

1',3',3'-trimethyl-1-(4-nitrophenyl)-2-phenyl-3-indolo-3H-pyrrolo[2,3-b]pyridocarbocyanine p-toluenesulfonate

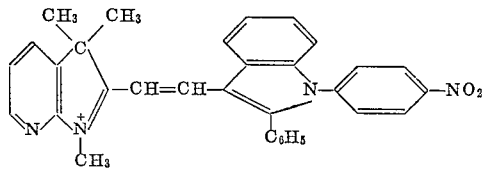

This dye is prepared as described in Example 7 except that a mixture of 1,2-dihydro-1,3,3-trimethyl-2-methylenepyrrolo[2,3-b]pyridine (0.52 g., 0.003 mole) and p-toluenesulfonic acid monohydrate (0.6 g.) is used in place of the 1,3-diethyl-2-methylimidazo[4,5-b]quinoxalinium p-toluenesulfonate. The dye is collected and purified by recrystallization from ethanol. After two recrystallizations the yield of dye is 0.9 g. (41%), M.P. 251–253° d.

EXAMPLE 10

1,3,3'-trimethyl-5-nitro-1'-(4-nitrophenyl)-2'-phenyl-indo-3'-indolocarbocyanine p-toluenesulfonate

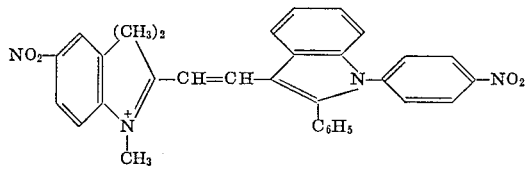

This dye is prepared in the manner described in Example 7 except that 1,2,3,3-tetramethyl-5-nitroindolium p-toluenesulfonate (1.17 g., 0.003 mole) is used in place of the 1,3-diethyl-2-methylimidazo[4,5-b]quinoxalinium p-toluenesulfonate. After two recrystallizations from ethanol the yield of purified dye is 1.2 g. (56%), M.P. 268–270° d.

The dyes of Examples 7–10 are tested photographically by the procedure described in Example 1, except that the emulsion employed is a fogged silver bromoiodide emulsion of the type described by Berriman in U.S. Pat. 3,367,778, issued Feb. 6, 1968. The photographic characteristics of the emulsions obtained are listed in Table 3 below and compared with similar emulsions in which the dyes of Examples 7–10 are replaced with dyes of Examples 2, 3, 6 and 5. The dyes of Examples 2, 3, 6 and 5 are similar to the dyes of Examples 7–10, except that in the latter dyes, the 1-aryl group features a nitro substituent. Dyes having a 1-nitroaryl group exhibit better stability than 1-aryl substituted dyes, as shown in Table 3.

TABLE 3

| Example number | Dye concentration mg./ mole silver | Relative clear speed | Density Max. unexposed areas | Density Min. exposed areas | Percent $D_{max.}$ loss 1 week 120° F., 50% rel. humidity | Max. sensitivity, nm. |
|---|---|---|---|---|---|---|
| 7 | 533 | 871 | 1.62 | .05 | 18.5 | 535 |
| 2 | 500 | 871 | 1.64 | .05 | 22 | 545 |
| 8 | 500 | 562 | 1.90 | .06 | 27.4 | 570 |
| 3 | 600 | 692 | 1.96 | .08 | 36.7 | 575 |
| 9 | 700 | 708 | 1.88 | .05 | 25.5 | 540 |
| 6 | 600 | 891 | 1.81 | .04 | 35.9 | 540 |
| 10 | 534 | 759 | 1.58 | .09 | 19 | 570 |
| 5 | 500 | 832 | 1.54 | .07 | 24.6 | 570 |

Comparison of the data for the dyes derived from 1-(nitroaryl)-2-arylindole with that for the dyes from 1,2-diarylindole thus shows that the nitro substituted dyes confer better incubation stability.

The following examples further illustrate the preparation of fogged, direct positive silver halide emulsions and elements with the dyes of this invention.

EXAMPLE 11

To 9.0 pounds of a silver chloride gelatin emulsion containing an equivalent of 100 grams of silver nitrate is added 0.017 gram of the dye of above Example 2 of the invention. The emulsion is coated on a non-glossy paper support, and is flashed with white light to give a density of 1.2 when developed in the following developer, diluted 1 part to 2 parts of water:

| | Grams |
|---|---|
| N-methyl-p-aminophenol sulfate | 3.1 |
| Sodium sulfite, des. | 45 |
| Hydroquinone | 12 |
| Sodium carbonate, des. | 67.5 |
| Potassium bromide | 1.9 |
| Water to 1 liter. | |

The light fogged material thus obtained can be exposed to an image with light modulated by a Wratten No. 15 filter to give a direct positive image. Similar results are obtained when the dyes of Examples 1 or 3 to 6 of the invention are substituted for the aforementioned dye of this example.

EXAMPLE 12

Seven pounds of a silver chloride gelatin emulsion containing the equivalent of 100 g. of silver nitrate is heated to 40° C. and the pH is adjusted to 7.8. Eight ml. of full strength (40%) formalin solution is then added and the emulsion is held at 40° C. for 10 minutes. At the end of the holding period, the pH is adjusted to 6.0 and 0.125 g. of the dye of above Example 4 is incorporated therein. The emulsion is then coated on a support, and the element so obtained provides good direct positive images. Similar results are obtained when the dyes of Examples 1 to 3 and 5 to 6 are used in place of the dye of this example.

It will be apparent from the foregoing disclosure and above Examples 1 to 6 that by appropriate selection of intermedates defined by Formulas III, IV and V above, other cyanine dyes of the invention defined by Formulas I and II can be prepared having generally similar good properties as electron acceptors and spectral sensitizers, together with good keeping stability, in fogged direct positive photographic emulsions which may also contain color formers. Typical dyes include, for example, 1,2-diphenyl-3'-ethyl-6'-nitroindolo-oxacarbocyanine salt (e.g., the chloride, bromide, iodide, perchlorate, p-toluenesulfonate, etc. salts); 1,2-diphenyl-3'-methyl-6' - nitroindoloselacarbocyanine salt (e.g., the chloride, bromide iodide, perchlorate, p-toluenesulfonate, etc. salts); 1,3-diallyl-6-chloro-1',2'-diphenylimidazo[4,5-b]quinoxalino-3 - indolocarbocyanine salt (e.g., the chloride, bromide, iodide, perchlorate, p-toluenesulfonate, etc. salts); 5,5'-dinitro-1,1',2,2'-tetraphenyl-3,3'-indolocarbocyanine salt (e.g., the chloride, bromide, iodide, perchlorate, p-toluenesulfonate, etc. salts); 1,3-diethyl-5'-methyl-1',2'-diphenylimidazo[4,5-b]quinoxalino-3'-indolocarbocyanine salt (e.g., the chloride, bromide, iodide, perchlorate, p-toluenesulfonate, etc. salts); 5-methoxy-1,2-diphenyl-3'-ethyl-6'-nitroindolothiacarbocyanine salt (e.g., the chloride, bromide, iodide, perchlorate, p-toluenesulfonate, etc. salts); 5',6-dichloro-1,1',2',3-tetraphenylimidazo[4,5-b]quinoxalino-3' - indolocarbocyanine salt (e.g., the chloride, bromide, iodide, perchlorate, p-toluenesulfonate, etc. salts); and the like.

All of the dyes of this invention resist unsensitizing in direct positive emulsions containing color former. As is known practically all photographic color formers tend to cause sensitizing dyes to become unsensitized in direct positive emulsions. Thus, the dyes of this invention can be advantageously used with any of the photographic color formers, including monomeric and polymeric color formers, such as pyrazolone, phenolic, heterocyclic, and open chain couplers having a reactive methylene group, such as any of those specifically referred to in the Jelley et al., Fierke et al., Fisher and Wilmanns patents identified below, or in U.S. Pat. 2,600,788 or 2,983,608, to provide emulsions which retain this spectral sensitivity during storage.

The following specific example illustrates the preparation of the 1,2-arylindole-3-carboxyaldehyde intermediates that are employed herein to prepare the novel cyanine dyes of the invention.

EXAMPLE 13

1,2-diphenylindole-3-carboxaldehyde 1,2-diphenylindole prepared as described by Mann and Haworth, J. Chem. Soc., 1944, p. 674 (18 g.) is dissolved in dimethylformamide (40 ml.) and added to a mixture of phosphoryl chloride (7 ml.) and dimethylformamide (24 ml.) cooled in ice. The mixture is removed from the ice bath and heated at 35° C. for one hour. After pouring onto ice, 10% sodium hydroxide solution (100 ml.) is added and the mixture heated on the steam bath for ten minutes. The cooled mixture is filtered and the product recrystallized from acetic acid to give the pure aldehyde 17.2 g. (86%), M.P. 232–234° C.

By substituting other dye compounds of the invention, as defined by Formulas I and II above, into the procedure of the above examples similar fogged, direct positive photographic silver halide emulsions and photographic elements containing such novel emulsions may be prepared.

1-(4-nitrophenyl)-2-phenylindole (VI) can be prepared by the following reaction.

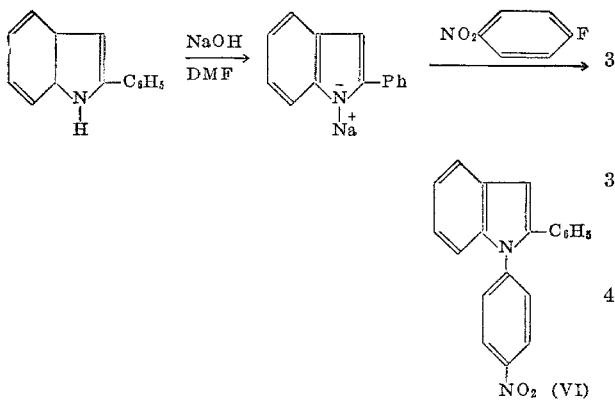

VI is converted into the aldehyde VII by the Vilsmeier reaction and VII is used to prepare the dyes described in Examples 7–10.

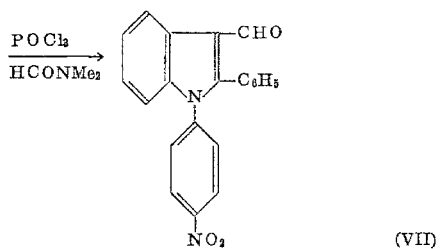

EXAMPLE 14

1-(4-nitrophenyl)-2-phenylindole VI

To a suspension of sodium hydride (0.8 g. of 50% dispersion in mineral oil) in dry dimethylformamide is added 2-phenylindole (4 g.) in small portions. When the evolution of hydrogen had ceased, 4-nitrofluorobenzene (2.8 g.) is added. The reaction mixture is stirred at room temperature for two days and then poured onto ice. They precipitated solid is removed by filtration and recrystallized from acetic acid. The product weights 3.2 g. and melts at 115–125°. It is purified by chromatography on neutral alumina. Elution with a mixture of ligroin/chloroform 9:1 gives a yellow solid (2.5 g.). After recrystallization from ethanol 2.1 g. (33%) of product melting at 138–140° is obtained.

Analysis.—Calcd. for $C_{20}H_{14}N_2O_2$ (percent): C, 76.4; H, 4.5; N, 8.9. Found (percent): C, 76.4; H, 4.6; N, 8.7.

The reaction is repeated using the following quantities:

|  | G. |
|---|---|
| 2-phenylindole | 40 |
| Sodium hydride (disp.) | 8 |
| 4-nitrofluorobenzene | 35 |

The reaction mixture is kept at 40° overnight and then poured into ice water. The gummy solid obtained by decantation of the aqueous layer is warmed with ethanol (200 ml.) and filtered. The product after one recrystallization from acetic acid weighs 36 g. and melts at 136–138°. It is sufficiently pure for the next step without further purification.

EXAMPLE 15

1-(4-nitrophenyl)-2-phenylindole-3-carboxaldehyde VII

Phosphoryl chloride (5 g.) is added to dry dimethyl formamide (150 ml.) at 0°. 1-(4-nitrophenyl)-2-phenylindole (9 g.) is added and the reaction mixture maintained at 55–60° for 75 minutes. The mixture is poured onto ice, basified with 10% sodium hydroxide solution (100 ml.) and heated to 90° for 5 minutes. After being chilled, the product is filtered off and recrystallized from acetic acid. The yield of aldehyde melting at 241–242° is 8 g. (65%).

Analysis.—Calcd. for $C_{21}H_{14}N_2O_3$ (percent): C, 73.7; H, 4.1; N, 8.2. Found (percent): C, 73.6; H, 4.0; N, 8.4.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating material, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al. U.S. Pat. 2,322,-027, issued June 15, 1943, Fierke et al. U.S. Pat. 2,801,-171, issued July 30, 1957, Fisher U.S. Pat, 1,055,155 and 1,102,028, issued Mar. 4, 1913 and June 30, 1914, respectively, and Wilmanns U.S. Pat. 2,186,849, issued Jan. 9, 1940. They can also be developed using incorporated developers such as polyhydroxybenzenes, aminophenols, 3-pyrazolidones, and the like.

Silver halide sensitized with the dyes of this invention can be dispersed in any of the binders disclosed and referred to in Beavers U.S. Pat. 3,039,873 issued June 19, 1962, col. 13, or polymerized vinyl compounds such as those disclosed in U.S. Pats. 3,142,568, 3,193,386; 3,062,-674; and 3,220,844, and including the water insoluble polymers of alkyl acrylates and methacrylates, acrylic acid, sulfoalkyl acrylates or methacrylates and the like.

Although the invention has been described in considerable detail with particular reference to certain preferred embodiments thereof, it will be understood that variations and modifications can be effected within the spirit and scope of the invention as described hereinabove, and as defined in the appended claims.

I claim:
1. A cyanine dye selected from those represented by one of the following general formulas:

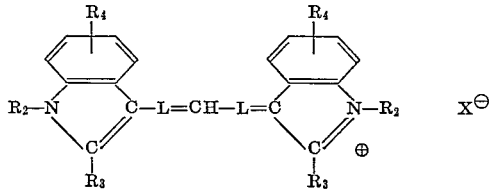

and

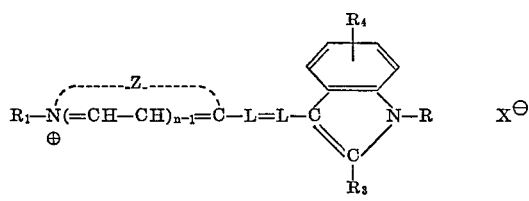

wherein $n$ represents a positive integer of from 1 to 2; L represents a methine linkage; $R_1$ represents a member selected from the group consisting of an alkyl group of 1–4 carbon atoms, an alkenyl group of 1 to 4 carbon atoms and an aryl group of 6 to 10 carbon atoms; $R_2$ and $R_3$ each represents an aryl group of 6 to 10 carbon atoms, $R_4$ represents a member consisting of a hydrogen atom, an alkyl group of 1 to 4 carbon atoms, an alkoxy group of 1 to 4 carbon atoms, an aryloxy group of 6 to 10 carbon atoms, a halogen atom and a nitro; $X^\ominus$ represents an acid anion; and Z represents the non-metallic atoms necessary to complete a densensitizing nucleus selected from the group consisting of a nitrobenzothiazole nucleus, a nitrobenzoxazole nucleus, a nitrobenzoselenazole nucleus, a 3,3-dialkyl-3H-nitroindole nucleus, an imidazo[4,5-b]quinoxaline nucleus and a 3,3-dialkyl-3H-pyrrolo[2,3-b]pyridine nucleus.

2. A compound selected from those having the following formula:

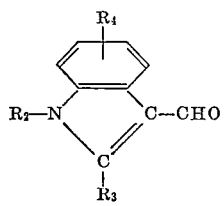

wherein $R_2$ and $R_3$ each represents an aryl group of 6 to 10 carbon atoms, and $R_4$ represents a member selected from the group consisting of a hydrogen atom, an alkyl group of 1 to 4 carbon atoms an alkoxy group of 1 to 4 carbon atoms, an aryloxy group of 6 to 10 carbon atoms, a halogen atom and a nitro.

3. The compound 1,2 - diphenylindole-3-carboxaldehyde.

4. A cyanine dye represented by the formula:

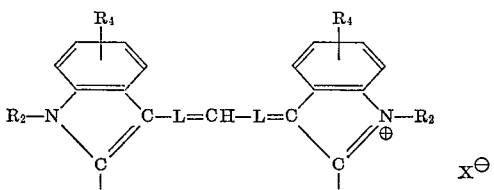

wherein L represents a methine linkage; $R_2$ and $R_3$ each represents an aryl group of 6 to 10 carbon atoms and $R_4$ represents a member selected from the group consisting of a hydrogen atom, an alkyl group of 1 to 4 carbon atoms, an alkoxy group of 1 to 4 carbon atoms, a halogen atom, a nitro, and $X^\ominus$ represents an acid anion.

5. 1,1',2,2'-tetraphenyl-3,3'-indolocarbocyanine salt.

6. A cyanine dye represented by the formula:

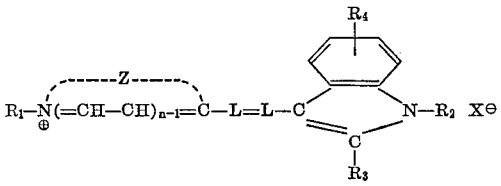

wherein $n$ represents a positive integer of from 1 to 2; L represents a methine linkage; $R_1$ represents a member selected from the group consisting of an alkyl group of 1 to 4 carbon atoms, an alkenyl group of 1 to 4 carbon atoms and an aryl group of 6 to 10 carbon atoms; $R_2$ and $R_3$ each represents an aryl group of 6 to 10 carbon atoms; $R_4$ represents a member selected from the group consisting of a hydrogen atom, an alkyl group of 1 to 4 carbon atoms, an alkoxy group of 1 to 4 carbon atoms, an aryloxy group of 6 to 10 carbon atoms, a halogen atom and a nitro; $X^\ominus$ represents an acid anion; and Z represents the non-metallic atoms necessary to complete a desensitizing nucleus selected from the group consisting of a nitrobenzothiazole nucleus, a nitrobenzoxazole nucleus, a nitrobenzoselenazole nucleus, a 3,3 - dialkyl - 3H-nitroindole nucleus, an imidazo[4,5-b]quinoxaline nucleus and a 3,3-dialkyl-3H-pyrrolo[2,3-b]pyridine nucleus.

7. A cyanine dye selected from the group consisting of 1,3-diethyl-1',2'-diphenylimidazolo[4,5-b]quinoxalino-3'-indolocarbocyanine salt;

1,2-diphenyl-3'-ethyl-6'-nitroindolothiacarbocyanine salt;

6-chloro-1,1',2',3-tetraphenylimidazo[4,5-b]quinoxalino-3-indolocarbocyanine salt;

1,3,3-trimethyl-5-nitro-1',2'-diphenylindo-3'-indolocarbocyanine salt;

1,2-diphenyl-1',3,3'-trimethyl-3-indolo-3H-pyrrolo[2,3-b]pyridocarbocyanine salt; and 1',3',3'-trimethyl-1-(4-nitrophenyl)-2-phenyl-3-indolo-3H-pyrrolo[2,3-b]pyridocarbocyanine salt.

References Cited
UNITED STATES PATENTS

| | | | |
|---|---|---|---|
| 3,582,343 | 6/1971 | Mee | 260—240.6 X |
| 3,598,595 | 8/1971 | Mee et al. | 260—240.6 X |

JOHN D. RANDOLPH, Primary Examiner

U.S. Cl. X.R.

96—101, 107, 109, 120; 260—240.6, 240.65, 319.1, 326.16